United States Patent [19]

Tomikawa et al.

[11] 4,026,841
[45] May 31, 1977

[54] MOLDING MATERIAL HAVING SUPERIOR BUFFERING CHARACTER

[75] Inventors: Masami Tomikawa; Akiji Tsunoda; Hideo Ohkawa; Kazuhisa Kaneda; Yutaka Mugino, all of Chiba, Japan

[73] Assignee: Idemitsu, Kosan Kabushiki-Kaisha (Idemitsu Kosan Co., Ltd.), Tokyo, Japan

[22] Filed: July 21, 1975

[21] Appl. No.: 597,356

Related U.S. Application Data

[63] Continuation of Ser. No. 370,675, June 18, 1973, abandoned.

[30] Foreign Application Priority Data

May 24, 1974 Japan .......................... 49-5432247

[52] U.S. Cl. .................... 260/2.5 HA; 260/42.24; 260/42.42
[51] Int. Cl.² ........................................ C08J 9/10
[58] Field of Search ........ 260/2.5 HA, 42.24, 42.42

[56] References Cited

UNITED STATES PATENTS 2,993,799 1/1961 Blake .............................. 260/42.46
3,862,963 1/1975 Hoshi et al. ..................... 260/2.5 R

OTHER PUBLICATIONS

"Smiths College Chemistry", by Ehret, 6th Ed., 1946, p. 460.

Primary Examiner—Morton Foelak
Attorney, Agent, or Firm—William J. Daniel

[57] ABSTRACT

A molding material having superior buffering character, moldability and dimensional stability obtained by incorporating a copolymer composed predominantly of polyethylene or ethylene with an inorganic filler blend comprising sand with an average particle size of 100 to 500 microns and calcium sulfite, and foaming the resulting composition. A molded product having a lustrous and beautiful superficial coating can be obtained by pressing the aforementioned foamed body while it is still hot against a smooth cool solid surface and cooling the foamed body down to a temperature below its softening point. Further, the aforementioned molding material is useful for packings, mattresses and lightweight construction materials.

2 Claims, 4 Drawing Figures

MOLDING MATERIAL HAVING SUPERIOR BUFFERING CHARACTER

This is a continuation, of Ser. No. 370,675, filed June 18, 1973, now abandoned.

BACKGROUND OF THE INVENTION

This invention relates to novel molding materials capable of exhibiting excellent buffering effect over a wide range of loads and having superior moldability and dimensional stability.

Heretofore, foams of thermoplastic resins such as polystyrene resins, polyvinyl chloride resins, polymethacrylic ester resins and polyolefin resins have been used extensively as buffering material.

However, the buffering character of these resin foams is generally not satisfactory. By way of example, if such resin foam is used as packing material provided with suitable recesses, the packed product is prone to incur such inconvenience as damage caused during transport. Although some resin foams have comparatively good buffering property, the applicable load range is narrow; though superior buffering effect can be exhibited over a certain range of loads, sufficient buffering effect cannot be obtained over the other range of loads. Further, moldability and dimensional stability of the prior art resin foams are poor. Therefore, when they are processed by die pressing, die stamping or the like technique to have complicated shapes or patterns, it will be difficult to obtain a reproduction of exact dimensions and configuration.

BRIEF SUMMARY OF THE INVENTION

Accordingly, it is an object of this invention to provide a molding material which can exhibit superior buffering effect over a wide range of loads.

It is another object of this invention to provide a buffering material having superior moldability and dimensional stability.

It is still another object of this invention to provide a method of manufacturing foamed resin moldings having a lustrous and beautiful surface.

It is further object of this invention to provide mattresses, packings and lightweight construction materials made from the aforementioned molding material.

The above and other objects, features and advantages of this invention will become more apparent from the following description taken in connection with the accompanying drawing, wherein.

DETAILED DESCRIPTION OF THE INVENTION

Figure 1:
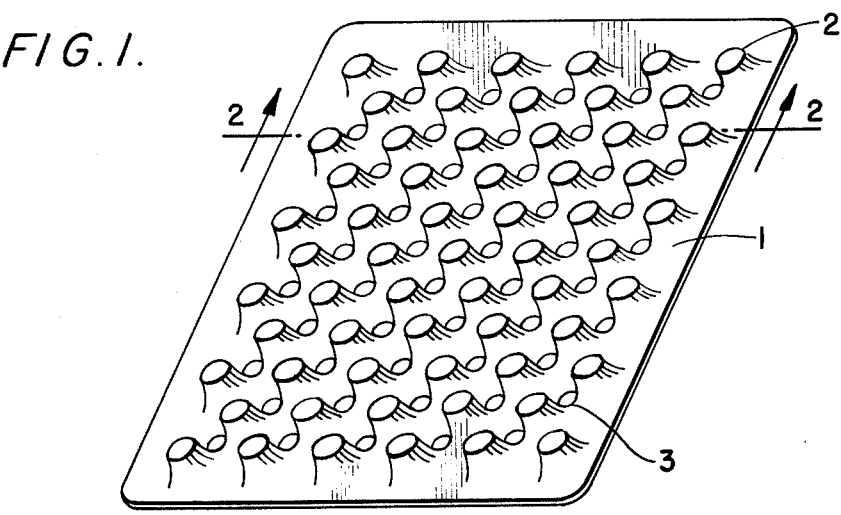
FIG. 1 is a perspective view showing an example of the buffering material produced by using the molding material according to this invention.

As the result of extensive researches made for the purpose of overcoming the aforementioned drawbacks inherent in the prior art resin foams, it has now been found that foamed bodies having superior moldability and excellent buffering character against a wide range of loads can be obtained by foaming polyethylene resin compositions containing both sand and calcium sulfite.

In order to obtain resin foams exhibiting satisfactory moldability, dimensional stability and buffering effect against a wide range of loads according to the invention, it is necessary to use a polyethylene resin as the resin component and both sand and calcium sulfite as the filler. The intended effects cannot be obtained by using a conventional inorganic filler usually used with various resins, for instance, such filler as talc, clay, silica, asbestos and carbon black. Further, a foamed body capable of displaying excellent buffering effect against a wide range of loads cannot be obtained by using sand alone or calcium sulfite alone. By using both sand and calcium sulfite in combination it is possible to obtain a desired foamed body having the useful properties coming from both of the filler components.

The molding material according to the invention is manufactured by foaming a polyethylene resin incorporated with a relatively large amount of sand and calcium sulfite in the presence of a foaming agent and a bridging agent under heating. As the polyethylene resin, any of homopolymers, copolymers and blends including polyethylene such as various high pressure method polyethylene, ethylene/vinyl acetate copolymers and blends of medium pressure method polyethylene and ethylene/vinyl acetate copolymer, so far as they contain polyethylene as the major component.

The sand used together with calcium sulfite as the filler according to the invention preferably has average particle size ranging from 100 to 500 microns. The sand of such particle size has good compatibility with the polyethylene resin and is less expensive since it occurs in nature. If the particle size of sand is smaller than 100 micron, the buffering effect of the foamed body tends to be reduced. On the other hand, if the particle size becomes greater than 500 microns, the mechanical strength of the foamed body tends to be reduced. By the term "average grain size" used herein is meant the arithmetic mean diameter of dispersed individual particles of sand.

According to this invention, no limitation exists in the quantity of sand and calcium sulfite to be incorporated into the polyethylene resin. The quantity can suitably be selected within a range free from spoiling the properties of the resin. Generally, it is suitably selected from the range of 20 to 90 percent by weight to meet specific purposes of the buffering material. Also, no limitation exists in the proportion of sand to calcium sulfite but the proportion is suitably selected to meet the desired characteristics of the buffering material. Generally, the buffering effect tends to increase with increase of the proportion of sand. A preferred proportion is 20 to 500 parts by weight of calcium sulfite per 100 parts by weight of sand. The incorporated sand and calcium sulfite not only serve as filler but also constitute nuclii of effervescence in the process of manufacturing foamed body, thus making it possible to produce a foamed body containing uniformly distributed cells of comparatively large sizes and obtain uniform foaming factor over the whole foamed body. As the thermal conductivity of the foamed body is higher than that of the polyethylene resin, the foamed body can quickly transmit heat accummulated in the inner portion thereof to the surfaces thereof, resulting in effective shortening of time required for foaming and molding and in inhibition of the formation of internal strain affecting dimensional stability.

The foaming agent used in the manufacture of the foamed body according to this invention may be conventional ones such as azo-dicarboxylamide, diphenylsulfon-3,3'-disulfehydrazide and benzylsulfonic diphenylhydrazide. As the bridging agent, organic peroxides such as dicumyl peroxide, di-tertiary butyl peroxide, 1,3-bis(tertiarybutyl peroxyisopropyl) benzene can be used. In the production of the foamed body, a suitable foaming factor is 10 to 30.

The foamed body obtained by foaming a polyethylene resin composition containing sand and calcium sulfite according to this invention has very useful features as the molding material. Namely, the foamed body according to this invention exhibits superior buffering effect over a wide range of loads, as compared with the prior art foamed body used as buffering material, and also has good moldability and dimensional stability.

In a further aspect of this invention, it is possible to obtain foamed polyethylene resin moldings having a lustrous and beautiful superficial coating by adding a foaming agent and bridging agent to a polyethylene resin composition containing a comparatively large quantity of sand, foaming the mixture under heating and then pressing the resultant thermally foamed body against a smooth cool solid surface thereby cooling the thermally foamed body down to a temperature below its softening point.

The color and touch of the surface of the foamed body obtained in this way vary according to the kind of sand used. In any case, however, by bringing the thermally foamed body into forced contact with a smooth cool solid surface a superficial resin film containing minute sand particles is formed. This resin film gives a lustrous and aesthetic hue coupled with the desirous light-reflecting effect of the sand particles contained therein. For example, by using gray sand of 150 to 300 microns in particle diameter chiefly composed of silica and alumina with the balance being iron oxide etc. a lustrous superficial coating of a light silvery brown color can be obtained. The quantity of sand contained in the foamed body is generally 20 weight percent or more, preferably at least 40 weight percent.

In one preferred method according to the invention, the aforementioned composition is kneaded at a temperature of 90° to 100° C by the aid of a suitable kneading means such as an intermixer, and the resultant mixture is charged into a metal mold of a press molder and pressed while heating to a temperature of about 180° to 200° C for a predetermined period. The mixture is suddenly released from the mold, thereby obtaining a thermally foamed body kept at a temperature above the softening point thereof. Then, the thermally foamed body above the softening point thereof is pressed against a smooth cool solid surface such as a metal surface, glass surface or wooden surface held at a temperature below the softening point, whereby the thermally foamed body is cooled to a temperature below the softening point and hardened.

According to this method, products of various shapes can be obtained by suitably selecting the shapes of the foaming mold and cool surface. For example, when the thermally foamed body is pressed with a die having a desired curved or indented surface a product faithfully copying such shape can be obtained.

The polyethylene resin foamed body thus obtained has the aforementioned lustrous and beautiful superficial coating and can exhibit extremely high aesthetic effects. The foamed body according to the invention may be used for indoor ornamental articles such as wall materials and frames. It can also be used for toys and package containers for high quality goods.

By press molding the molding material of this invention into a sheet having a number of complementary concavoconvex patterns on both sides it is possible to obtain lightweight construction materials of small coefficient of thermal contraction and large coefficient of moisture premeability. By the term "complementary concavoconvex patterns" is meant herein a structure of a sheet having an alternate arrangement of a number of protuberances and recesses on each side in such manner that a protuberance is formed on one side where a recess is formed on the other side so that the sheet has a wavy sectional profile with a thickness.

Figure 2:
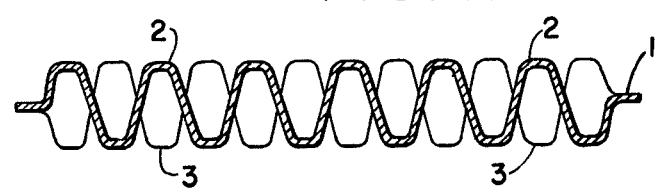
FIG. 2 is a sectional view of the same buffering material as shown in FIG. 1.

FIGS. 1 and 2 show examples of such lightweight construction material. FIG. 1 is a perspective view of a lightweight construction material 1 having recesses 2 and protuberances 3, and FIG. 2 is a section taken along the line A—A in FIG. 1, showing the complementary arrangement of protuberances and recesses.

This lightweight construction material is very light in weight because of its small bulk density and exhibits excellent buffering character. Also, it has such features as small coefficient of thermal contraction and large coefficients of moisture and air permeability which could not been expected form the prior art material of this kind. Thus, it is suitable as buffering materials, construction materials such as wall material and ceiling material and various ornamental materials. Further, these materials can readily be ground, cut and processed for assembling. Furthermore, they have satisfactory bonding character and so are suitable as core material for composite panels.

It is also possible to manufacture a mattress by laminating soft polyurethane foamed sheets on both sides of the lightweight construction material used as core material and covering the resultant structure with cloth.

Figure 3:
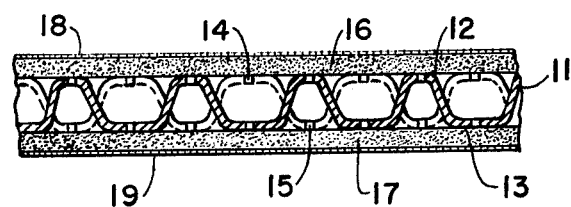
FIG. 3 is a longitudinal sectional view showing an example of a mattress using the buffering material of FIG. 2 as an intermediate layer.

FIG. 3 is a sectional view showing an example of such mattress wherein reference numeral 11 designates such lightweight construction material formed with holes 14 at the center of individual protuberances 12 and recesses 13. Numerals 15 and 16 designate soft polyurethane foamed sheets, and numerals 17 and 18 cloth covers.

This mattress using a foamed sheet of a specific material and structure has excellent air permeability, cushioning property, hot insulation property and touch. Besides, finger-pressure therapeutical effects are obtained by virture of the protuberances formed on the surface of the core material, so that one can feel extreme comfortability on this mattress. Because of excellent restoring character the mattress retains its shape even after long and very frequent use. It is also a merit of the mattress that it is light in weight and can conveniently be transported. The cushioning character of this mattress, consists of adequate rigidity and adequate flexibility, unlike the prior art one, so that the mattress is not prone to incur such inconvenience as excessive sinking of the body in it. Such adequate rigidity is achieved by the use of the foamed polyethylene resin sheet having a special configuration, while said adequate cushioning property is attributable to the soft foamed urethane sheets laminated on both sides of the foamed polyethylene resin sheet.

This invention will be understood more readily with reference to the following example, which is intended to illustrate this invention and is not to be construed to limit the scope of this invention.

EXAMPLE

High pressure method polyethylene (with a melt index of 5.0 and a density of 0.923 g/cm$^3$), sand (with an average particle size of 150 to 300 microns) and calcium sulfite (CaSO$_3$·½H$_2$O, with a particle size of 4 to 6 microns) were mixed in a predetermined proportion, and azo-dicarboxyl-amide as foaming agent and 1,3-bis(tertiary butyl peroxyisopropyl)benzene as bridging agent were added to the resultant mixture. The resultant admixture was then uniformly kneaded at a temperature of 90° to 100° C with an intermixer.

The mixture thus kneaded was then charged into a sealed metal mold (20 cm × 20 cm × 20 cm) of a press molder, heated under a pressure of 30 kg/cm$^2$ and at a temperature of 180° to 200° C for a predetermined time and suddenly released from the mold, thereby obtaining a foamed body.

The compositions of the starting materials and the foaming conditions adopted in this experiment are shown in the table given below.

| Ex. No. | Resin Composition Polyethylene (parts by weight) | Filler (parts by weight) Sand | Filler (parts by weight) Calcium sulfite | Foaming agent (parts by weight) | Bridging agent (parts by weight) | Foaming time (minutes) |
|---|---|---|---|---|---|---|
| 1 | 40 | 60 | 0 | 3.0 | 0.25 | 8 |
| 2 | 40 | 50 | 10 | 3.0 | 0.25 | 9 |
| 3 | 40 | 30 | 30 | 3.0 | 0.25 | 10 |
| 4 | 40 | 10 | 50 | 3.0 | 0.25 | 11 |
| 5 | 40 | 0 | 60 | 3.0 | 0.25 | 12 |

Figure 4:
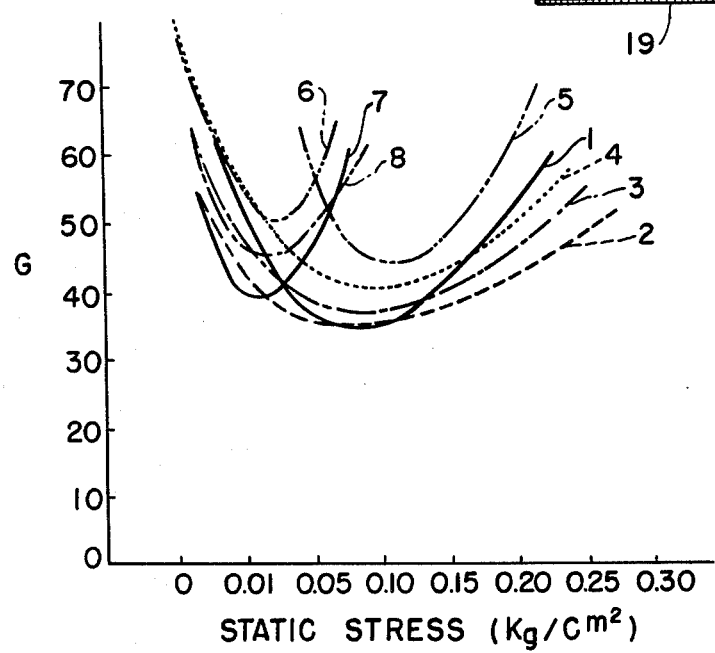
FIG. 4 is a graph showing the relation between static stress and G value for molding material according to this invention and the molding material in the prior art.

FIG. 4 shows static stress versus G value plots for the foamed bodies obtained as above stated. The G value is a unit customarily used for the determination of the quality of the buffering material of this kind. It is the value of deceleration (or negative acceleration) produced due to force exerted to a weight by the test material when the weight is allowed to fall on the test material from a predetermined height (60 cm), and it is expressed in terms of multiples of the gravitational acceleration. Here, the force F exerted to the load of weight W = mg (m: mass, g: gravitational acceleration) due to the buffering action of the test material is related to the deceleration $a$ and G value as is expressed by an equation $$F = ma = mg \cdot a/g = W \cdot G$$

It will be understood from this equation that the force F exerted to the weight by the test material is proportional to the G value. Thus, the smaller the G value the smaller the force exerted by the material at the time of collision, that is, the better is the buffering property of the test material. The G value shown in FIG. 4 represents an average value obtained by dropping the weight five times.

The G value varies for the same buffering material depending upon the load of the weight. The static stress shown in the abscissa in FIG. 4 represents a standard load, that is, a load received per unit area of the test material when the weight is placed on the test material. In this case, denoting the area of the test material by A and load of the weight by W, the static stress S is given as $$S = W/A$$

For the sake of comparison, FIG. 1 also shows a static stress versus G value plot for a prior art foamed body. The numbers represent the following materials:

| No. | Foamed body |
|---|---|
| 6 | Polystyrene foam[1] |
| 7 | Polystyrene foam[2] |
| 8 | Lamination of the polystyrene foams 6 and 7 |

Remarks:
[1] "Styrofoam" manufactured by Koga Denko K.K.
[2] "Esafoam" manufactured by Asahi Dau K.K.

It will be seen from the experimental results shown in FIG. 4 that the foamed body of this invention having the buffering characteristic shown by curve 1 exhibit low G value and superior buffering effect as compared with the prior art foamed body having the buffering characteristic shown by curve 2. Besides, the rate of change of the G value of the foamed body of this invention with the static stress is very small as compared with that of the prior art foamed body. Thus, it will be understood that the foamed body of this invention shows excellent buffering effect over a wide range of loads.

What is claimed is:

1. A foamed body of improved cushioning moldability, and dimensional stability consisting essentially of (1) about 80–10% by weight of a cross-linked foamed matrix of ethylene polymer and (2) distributed homogeneously within the polymer of said matrix about 20–90% by weight of a filler consisting of (a) sand having a particle size in the range of about 100–500 microns and (b) calcium sulfite particles in a ratio by weight of about 1:5–5:1.

2. The foamed body according to claim 1 wherein said sand constitutes at least about 40% by weight of said filler and polymer together.

* * * * *

UNITED STATES PATENT AND TRADEMARK OFFICE
CERTIFICATE OF CORRECTION

PATENT NO. : 4,026,841
DATED : May 31, 1977
INVENTOR(S) : Masami Tomikawa et al

It is certified that error appears in the above-identified patent and that said Letters Patent are hereby corrected as shown below:

In the Heading:

Item [30] Foreign Application Priority Data should be corrected to read:

-- June 19, 1972  Japan ............ 47-54322 --.

Signed and Sealed this twenty-third Day of August 1977

[SEAL]

Attest:

RUTH C. MASON
*Attesting Officer*

C. MARSHALL DANN
*Commissioner of Patents and Trademarks*